United States Patent
Sato et al.

[11] Patent Number: 5,186,525
[45] Date of Patent: Feb. 16, 1993

[54] HYDRAULIC BRAKING PRESSURE CONTROL SYSTEM FOR VEHICLE

[75] Inventors: Makoto Sato; Hiromi Inagaki; Wataru Saito; Kazuya Sakurai, all of Saitama; Koichi Hagiwara; Makoto Horiuchi, both of Nagano, all of Japan

[73] Assignees: Honda Giken Kogyo Kabushiki Kaisha, Tokyo; Nissin Kogyo Kabushiki Kaisha, Ueda, both of Japan

[21] Appl. No.: 744,116

[22] Filed: Aug. 9, 1991

[30] Foreign Application Priority Data

Aug. 10, 1990 [JP] Japan ................................. 2-213375

[51] Int. Cl.$^5$ ............................................. B60T 8/32
[52] U.S. Cl. ................................. 303/113.4; 188/358; 303/92; 303/116.1; 303/119.1; 303/117.1
[58] Field of Search ............... 303/113 SS, 113 TB, 303/113 TR, 114 PN, 114 PB, 115 R, 119 SV, 119 R, 116 SP, 116 R, 116 WP, 116 PC, 13, 92, 14, 52, 15–18, 10–12, 117, 93, 106, 100, 110, 7; 60/545, 547.1, 564, 565, 566; 188/358; 364/426.02, 426.03

[56] References Cited

U.S. PATENT DOCUMENTS

| | | | |
|---|---|---|---|
| 3,507,542 | 4/1970 | Cannella | 303/7 |
| 3,771,838 | 11/1973 | Rossigno et al. | 60/545 X |
| 4,166,654 | 9/1979 | Snodgrass | 303/14 |
| 4,404,633 | 9/1983 | Goicoechea | 303/93 X |
| 4,444,438 | 4/1984 | Knox | 303/117 X |
| 4,681,373 | 7/1987 | Nomura et al. | 303/106 |
| 4,812,777 | 3/1989 | Shirai | 303/15 X |
| 4,861,115 | 8/1989 | Petersen | 303/119 R |
| 4,902,075 | 2/1990 | Uno et al. | 303/14 |
| 4,919,492 | 4/1990 | Samuelson et al. | 303/15 X |
| 4,986,613 | 1/1991 | Nishii et al. | 303/13 X |
| 4,995,677 | 2/1991 | Matsuda et al. | 303/119 R |
| 5,013,094 | 5/1991 | Nishii et al. | 303/52 |
| 5,031,968 | 7/1991 | Takata | 303/119 R |
| 5,042,886 | 8/1991 | Sato | 303/93 |
| 5,083,075 | 1/1992 | Sato et al. | 303/92 X |

FOREIGN PATENT DOCUMENTS

| | | |
|---|---|---|
| 0348270 | 12/1989 | European Pat. Off. |
| 1-178062 | 7/1989 | Japan |
| 0279450 | 11/1990 | Japan ... 303/113 SS |
| WO90/12718 | 11/1990 | PCT Int'l Appl. |
| 2169975A | 7/1986 | United Kingdom |
| 2170286A | 7/1986 | United Kingdom |
| 2215416A | 9/1989 | United Kingdom |
| 2225397A | 5/1990 | United Kingdom |

Primary Examiner—Douglas C. Butler
Attorney, Agent, or Firm—Armstrong, Westerman, Hattori, McLeland & Naughton

[57] ABSTRACT

A hydraulic braking pressure control system includes a shut-off valve (4) which is provided in an oil passage (58) connecting a brake device with an output port in a master cylinder and which is brought into a closed state by a control circuit when a braking operation is detected by an operation-amount detector, and a locking device (5) for inhibiting the closing of the shut-off valve when the output hydraulic pressure from a hydraulic pressure supply source in equal to or less than a predetermined value. The shut-off valve is opened when there is no braking operation, thereby ensuring that even if a hydraulic pressure is delivered from a hydraulic pressure control valve when there is no braking operation, such hydraulic pressure can be released into a reservoir. In addition, if the hydraulic pressure in the hydraulic pressure supply source is abnormally reduced, that shut-off valve is locked in its opened state by the locking device to ensure that the output hydraulic pressure from the master cylinder can be applied to the brake device.

8 Claims, 2 Drawing Sheets

HYDRAULIC BRAKING PRESSURE CONTROL SYSTEM FOR VEHICLE

The field of the present invention is hydraulic braking pressure control systems for vehicles, and particularly such hydraulic braking pressure control systems comprising: a master cylinder having an output port through which a hydraulic pressure according to a braking operation can be delivered, the master cylinder having a reservoir associated therewith and leading to the output port when there is no braking; an operation-amount detector for detecting the amount of braking operation; a hydraulic pressure supply source; a hydraulic pressure control unit including a hydraulic pressure control valve interposed between a brake device mounted on a wheel and the hydraulic pressure supply source, and an electric actuator for actuating the hydraulic pressure control valve; and a control circuit for controlling the operation of the electric actuator in accordance with a detection valve provided by the operation-amount detector.

Such a hydraulic braking pressure control system for vehicles is already known, for example, from Japanese Patent Application Laid-open No. 178062/89.

In the above prior art system, a precision hydraulic braking pressure control can be achieved by a simple construction; however, as the hydraulic pressure control valve is operated by the electric actuator, it is feared that the electric actuator may be operated due to a fault in an electric circuit, when a braking operation is not desired.

Accordingly, it is an object of the present invention to provide a hydraulic braking pressure control system for a vehicle, wherein hydraulic braking pressure is prevented from being applied to the brake device when braking is not desired.

Thus according to the present invention there is provided a hydraulic braking pressure control system comprising: a master cylinder having an output port through which a hydraulic pressure for effecting a braking operation can be delivered, the master cylinder having a reservoir associated therewith and leading to the output port when there is no braking; an operation-amount detector for detecting the amount of braking operation; a hydraulic pressure supply source; a hydraulic pressure control unit including a hydraulic pressure control valve interposed between a brake device mounted on a wheel and the hydraulic pressure supply source, and an electric actuator for actuating the hydraulic pressure control valve; and a control circuit for controlling the operation of the electric actuator in accordance with a detection valve provided by the operation-amount detector; wherein the system further includes a shut-off valve which is provided in an oil passage connecting the brake device with the output port in the master cylinder and which is brought into a closed condition by the control circuit when a braking operation is detected by the operation-amount detector, and a locking means for inhibiting the closing of the shut-off valve when the output hydraulic pressure from the hydraulic pressure supply source is equal to or less than a predetermined value.

With such a construction, the shut-off valve is open when there is no braking operation. Therefore, even if a hydraulic pressure is delivered from the hydraulic pressure control valve when there is no braking operation, such hydraulic pressure is released into a reservoir. If the hydraulic pressure in the hydraulic pressure supply source is abnormally reduced, the shut-off valve is locked in an opened state by the locking means, so that the output hydraulic pressure from the master cylinder can be applied to the brake device through the shut-off valve, which is in the opened state.

An embodiment of the invention will now be described by way of example and with reference to the accompanying drawings, in which.

Figure 1:
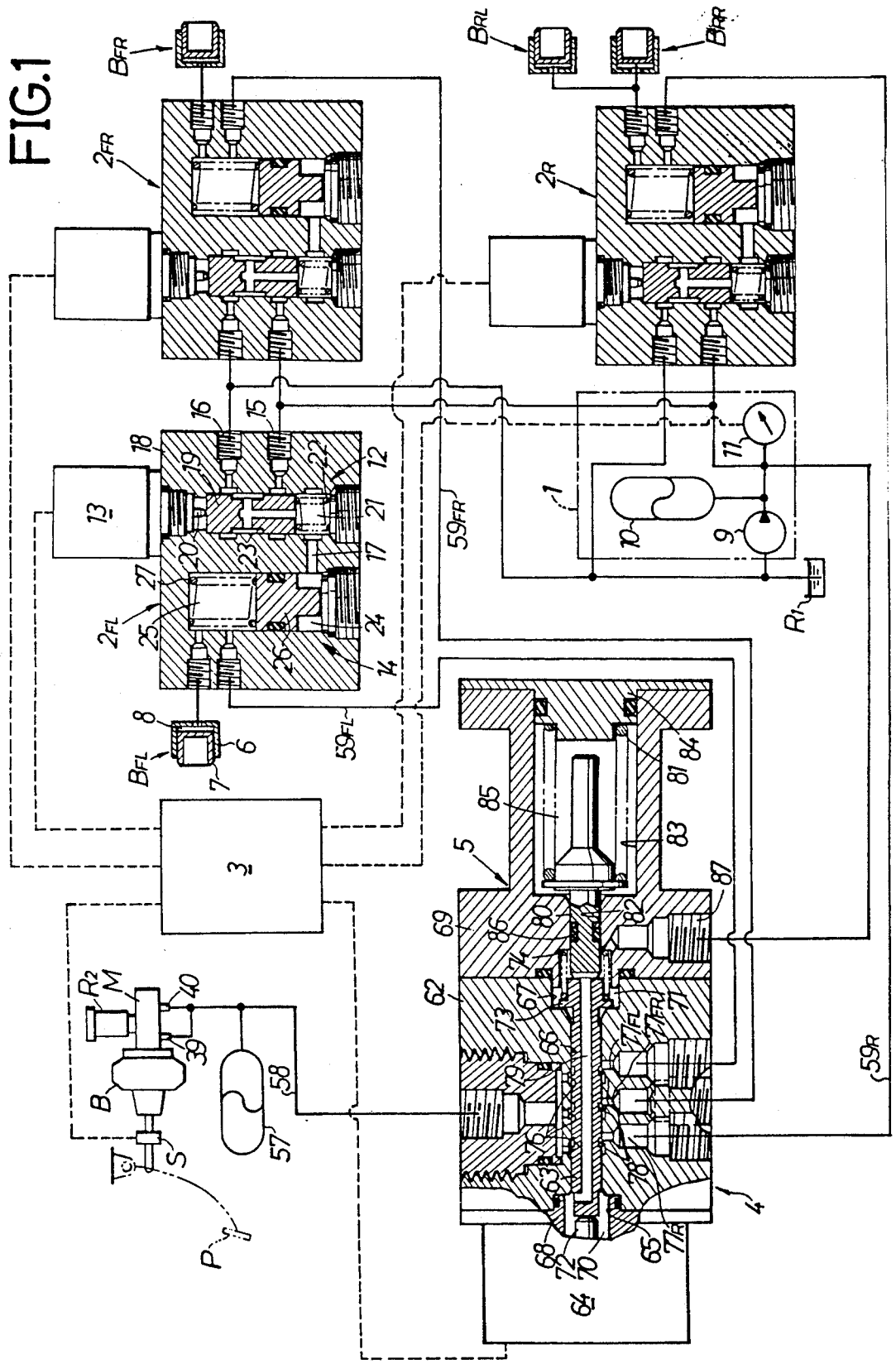
FIG. 1 is a hydraulic circuit diagram.

Referring first to FIG. 1, a hydraulic braking pressure control system for a front wheel drive vehicle comprises a master cylinder M adapted to deliver a hydraulic braking pressure in response to depression of a brake pedal P, a depression force sensor S which acts as a depression-amount detector for detecting the amount by which brake pedal P is depressed, a hydraulic pressure supply source 1, a left front wheel hydraulic pressure control unit $2_{FL}$ interposed between a left front wheel brake device $B_{FL}$ mounted on a left front wheel, which is a driving wheel, and the supply source 1, a right front wheel hydraulic pressure control unit $2_{FR}$ interposed between a right front wheel brake device $B_{FR}$ mounted on a right front wheel, which is also a driving wheel, and the supply source 1, a single rear wheel hydraulic pressure control unit $2_R$ interposed between left and right rear wheel brakes $B_{RL}$ and $B_{RR}$ mounted respectively on left and right rear wheels, which are follower wheels, and the supply source 1, a control circuit 3 comprising a computer for controlling the operation of the hydraulic pressure control units $2_{FL}$, $2_{FR}$ and $2_R$ in accordance with a detection value provided by the depression force sensor S, a shut-off valve 4 interposed between each of the brake devices $B_{FL}$, $B_{FR}$, $B_{RL}$ and $B_{RR}$ and the master cylinder M, and a locking means 5 associated with the shut-off valve 4.

Each of the brake devices $B_{FL}$, $B_{FR}$, $B_{RL}$ and $B_{RR}$ comprises a cylinder 6 having a piston 7 slidable therein, so that a braking force is produced by movement of the piston 7 according to a hydraulic braking pressure supplied to a hydraulic braking pressure chamber 8 which is defined between the cylinder 6 and the piston 7.

The hydraulic pressure supply source 1 comprises a hydraulic pump 9 for pumping working oil from a reservoir $R_1$, an accumulator 10 connected to the hydraulic pump 9, and a pressure switch 11 for controlling the operation of the hydraulic pump 9.

The left front wheel hydraulic pressure control unit $2_{FL}$, the right front wheel hydraulic pressure control unit $2_{FR}$, and the rear wheel hydraulic pressure control unit $2_R$, have basically the same construction, and hence only the construction of the control unit $2_{FL}$ will be described below in detail.

The control unit $2_{FL}$ comprises a hydraulic pressure control valve 12, a linear solenoid 13 serving as an electric actuator for operating the valve 12, and a hydraulic pressure transmitting mechanism 14.

The hydraulic pressure control valve 12 is comprised of a spool 19 which is slidably received in a first housing 18 having an input port 15 leading to the hydraulic pressure supply source 1, a release port 16 leading to the reservoir $R_1$, and an output port 17, so that the output port 17 communicates with either the input port 15 or the release port 16 in accordance with the axial movement of the spool 19. The linear solenoid 13 is connected to one end of the first housing 18.

The linear solenoid 13 serves to produce a thrust force according to an electric input quantity and has a drive rod 20 coaxially abutting against one end of the spool 19. An output hydraulic chamber 21 is defined in a facing relation to the other end of the spool 19 and leads to the output port 17, so that hydraulic pressure in chamber 21 opposes a thrust force applied to the spool 19 from the drive rod 20, and a return spring 22 is contained in the chamber 21 for biasing the spool 19 in a direction to increase the volume of the chamber 21. Thus, the drive rod 20 is normally in abutment against the one end of the spool 19, and the spool 19 and the linear solenoid 13 are thus operatively connected to each other.

An annular groove 23 is provided in an outer surface of the spool 19 at its intermediate portion and communicates with the output hydraulic pressure chamber 21 by way of an axial bore. The spool 19 is movable axially between a hydraulic pressure applying position in which the annular groove 23 leading to the chamber 21 is put into communication with the input port 15 to permit a hydraulic pressure from the hydraulic pressure supply source 1 to be applied to the chamber 21, and a hydraulic pressure releasing position in which the annular groove 23 is put into communication with the release port 16 to cause the communication of the chamber 21 with the reservoir $R_1$. The thrust force of the linear solenoid 13 urges the spool 19 toward the hydraulic pressure applying position, whilst a hydraulic pressure in the output hydraulic pressure chamber 21 and the spring force of the return spring 22 are applied to the spool 19 to urge it toward the hydraulic pressure releasing position.

The linear solenoid 13 generates a thrust force according to an energizing current quantity or according to a voltage when a resistance is constant, and in a certain stroke range the linear solenoid 11 generates a thrust force proportional to the energizing current quantity. Depending upon a magnitude relationship between such a thrust force, the hydraulic pressure in the output hydraulic pressure chamber 21, and the spring force of the return spring 22, the axial movement of the spool 19 causes the hydraulic pressure from the hydraulic pressure supply source 1 to be applied to the output hydraulic pressure chamber 21 or causes the hydraulic pressure in the chamber 21 to be released, whereby the hydraulic pressure from the supply source 1 is controlled in proportion with the energizing current for the linear solenoid 13 and is delivered through the output port 17.

The energizing current for the linear solenoid 13 is controlled by the control circuit 3 which controls the energizing current quantity in accordance with the detection value provided by the depression force sensor S during a normal braking operation.

The hydraulic pressure transmitting mechanism 14 is arranged in the same housing 18 as the hydraulic pressure control valve 12, and comprises a free piston 26 slidably received in the housing 18 with one end facing an input chamber 24 and the other end facing an output chamber 25, and a return spring 27 contained in the output chamber 25 to produce a spring force for biasing the free piston 26 toward the input chamber 24. The input chamber 24 is connected to the output port 17 in the hydraulic pressure control valve 12.

The hydraulic pressure transmitting mechanism 14 delivers a hydraulic pressure corresponding to an output hydraulic pressure from the hydraulic pressure control valve 12, out of the output chamber 25 by movement of the free piston 26 toward the output chamber 25 in accordance with a hydraulic pressure delivered from the control valve 12. The output chamber 25 is connected to the hydraulic braking pressure chamber 8 in the left front wheel brake device $B_{FL}$. Thus, the hydraulic pressure transmitting mechanism 14 serves to isolate the working oil closer to the brake device $B_{FL}$ from the working oil closer to the hydraulic pressure control valve 12.

Figure 2:
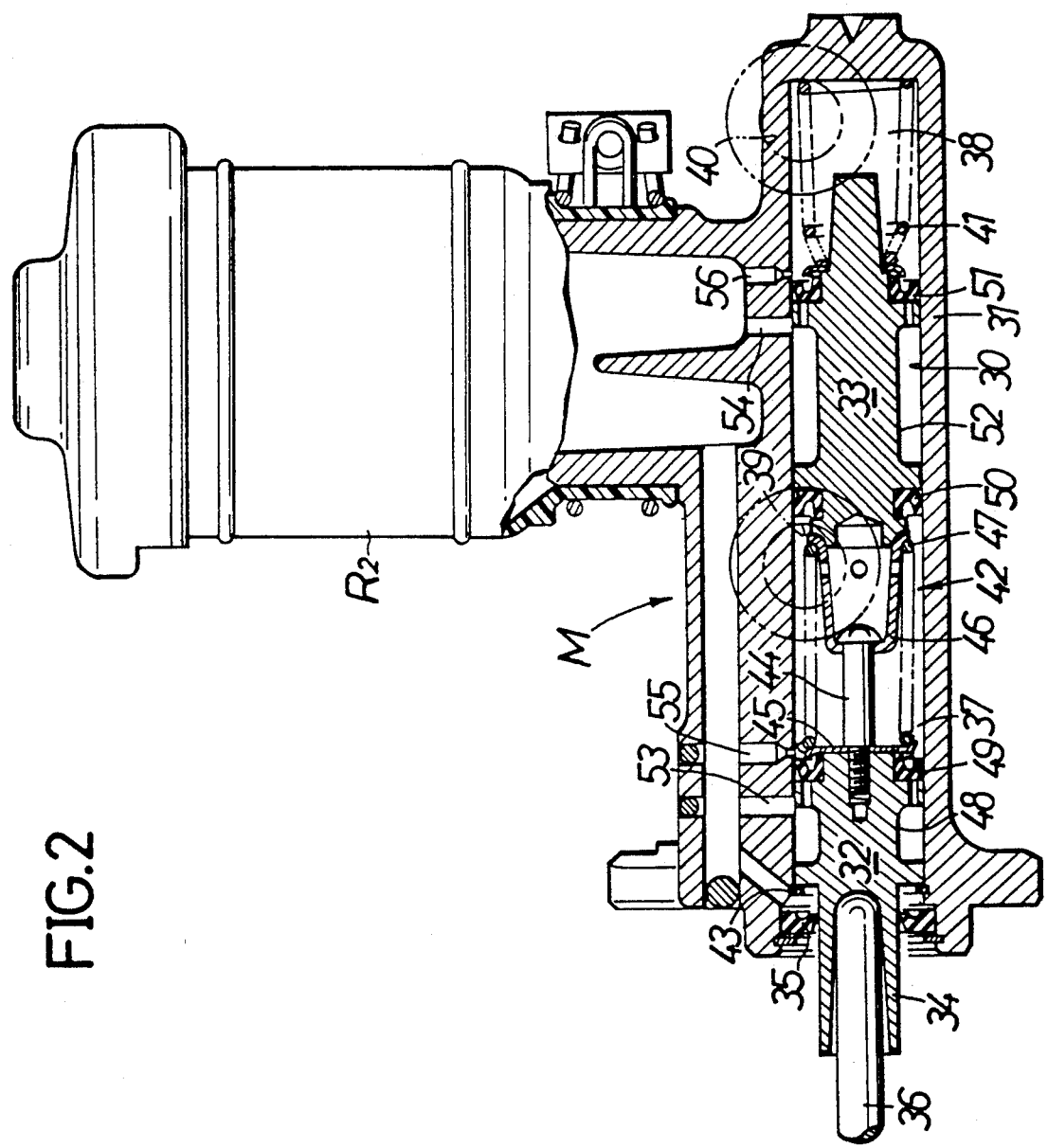
FIG. 2 is a longitudinal sectional view of a master cylinder.

Referring now to FIG. 2, the master cylinder M is a well-known tandem type master cylinder adapted to deliver a hydraulic braking pressure according to the operation of the brake pedal P, and includes a cylinder body 31 having a cylinder bore 30, and first and second working pistons 32, 33 slidably received in the cylinder bore 30.

The first working piston 32 is integrally provided with a piston rod 34 which projects rearwardly through a sealing member 35 interposed between the piston rod 34 and an inner surface of the cylinder bore 30 at its rear end, and a leading end of an urging rod 36 abuts against the piston rod 34. The second working piston 33 is slidably received in the cylinder bore 30 at a location spaced forwardly apart from the first working piston 32, so that a first hydraulic pressure chamber 37 is defined between the pistons 32 and 33, and a second hydraulic pressure chamber 38 is defined between the working piston 33 and a front end wall of the cylinder bore 30. Moreover, the cylinder body 31 is provided with a first output port 39 leading from the first hydraulic pressure chamber 37 and a second output port 40 leading from the second hydraulic pressure chamber 38.

A return spring 41 is mounted in a compressed manner between the second working piston 33 and the front end wall of the cylinder bore 30. A piston-to-piston spacing restricting means 42 is provided between the first and second working pistons 32 and 33, and a retaining ring 43 is fitted to an inner wall of the cylinder bore 30 for providing a retreat limit position for the first working piston 32.

The piston-to-piston spacing restricting means 42 is comprised of a stationary seat plate 45 fixed to a front end of the first working piston 32 by a bolt 44, a movable seat plate 46 engaged with the bolt 44 for longitudinal relative movement in a limited range, and a return spring 47 mounted in a compressed manner between the seat plates 45 and 46. The return spring 47 has a preset load set larger than that of the return spring 41. Such piston-to-piston spacing restricting means 42 determines a retreat limit position for the second working piston 3 when the first working piston 32 is in the retreat limit position.

An annular groove 48 is provided in an outer surface of the first working piston 32, and in front of the annular groove 48 a cup seal 49 is fitted over the outer surface of the piston for permitting flow of working oil from the annular groove 48 toward the first hydraulic pressure chamber 37 when the hydraulic pressure in the first hydraulic pressure chamber 37 is reduced. A pair of cup seals 50 and 51 are also fitted over an outer surface of the second working piston 33 at an axial spacing from each other, and an annular groove 52 is provided between the cup seals 50 and 51. Moreover, the cup seal 51 located forwardly of the annular groove 52 permits flow of working oil from the annular groove 52 toward the second hydraulic pressure chamber 38 when the hydraulic pressure in the chamber 38 is reduced.

A reservoir $R_2$ is disposed on the cylinder body 31 above the cylinder bore 30, and the cylinder body is provided with supply ports 53 and 54 through which working oil in the reservoir $R_2$ is supplied to the annular grooves 48 and 52. The cylinder body 31 is further provided with relief ports 55 and 56 which permit the hydraulic pressure chambers 37 and 38 to be put into communication with the inside of the reservoir $R_2$ when the working piston 32 is retreated to the retreat limit position. The relief ports 55 and 56 serve to return surplus working oil from the hydraulic pressure chambers 37 and 38, respectively, to the reservoir $R_2$.

Therefore, when the master cylinder M is inoperative, i.e. when the working pistons 32 and 33 are in their retreat limit positions, the output ports 39 and 40 communicate with the reservoir $R_2$ through the hydraulic pressure chambers 37 and 38 and the relief ports 55 and 56.

A vacuum booster B is coaxially connected to a rear end of the cylinder body 31 of the master cylinder M, and the urging rod 36 of the vacuum booster B coaxially abuts against the piston rod 34. The depression force sensor S is interposed between the brake pedal P and the vacuum booster B, so that the depression force on the brake pedal P, i.e. the amount by which brake pedal P is depressed, is detected by the depression force sensor S, and a detection value thereof is delivered to the control circuit 3.

An oil passage 58 is connected commonly to both of the output ports 39 and 40 in the master cylinder M. An accumulator 57 is provided in the oil passage 58 for absorbing a reaction force to the depression of the brake pedal P. Oil passages $59_{FL}$, $59_{FR}$, and $59_R$ are connected to the output chambers 25 in the hydraulic pressure transmitting mechanisms 14 of the control units $2_{FL}$, $2_{FR}$ and $2_R$, respectively, and the aforementioned shut-off valve 4 is interposed between the oil passage 58 and the three oil passages $59_{FL}$, $59_{FR}$ and $59_R$.

The shut-off valve 4 comprises a second housing 62, a spool 63 slidably received in the second housing 62, and a drive solenoid 64 operatively connected coaxially to one end of the spool 63.

The second housing 62 is provided with a bore which is comprised of a first bore portion 65, a second bore portion 66 having a smaller diameter than that of the first bore portion 65, and a third bore portion 67 having a larger diameter than that of the second bore portion 66, these bore portions being coaxially connected to one another. A third housing 68 of the drive solenoid 64 is connected to one end wall of the second housing 62 to close the first bore portion 65, and a fourth housing 69 of the aforementioned locking means 5 is connected to the other end wall of the third housing 62 to close the third bore portion 67. An oil chamber 70 is defined between the second and third housings 62 and 68, and a hydraulic pressure working chamber 71 is defined between the second and fourth housings 62 and 69.

The spool 63 is slidably received in the second bore portion 66 with one end facing the oil chamber 70 and the other end facing the hydraulic pressure working chamber 71, and an urging rod 72 of the drive solenoid 64 coaxially abuts against one end of the spool 63. The spool is provided at its other end with a collar 73 which abuts against a step between the second and third bore portions 66 and 67 to restrain the movement of the spool 63 in one axial direction (toward the drive solenoid 64). Further, a spring 74 is mounted in a compressed manner in the hydraulic pressure working chamber 71 between the fourth housing 69 and the collar 73, so that the spool 63 is biased in the said one axial direction by the spring 74.

Three annular grooves 76 are provided in an inner surface of the second bore portion 66 at axially equal distances and are connected to the oil passage 58 leading to the output ports 39 and 40 in the master cylinder M. Three ports $77_{FL}$, $77_{FR}$ and $77_R$ are also provided in the second housing 62 and open into the inner surface of the second bore portion 66 adjacent, but axially spaced from, respective ones of the annular grooves 76, and are connected to the oil passages $59_{FL}$, $59_{FR}$ and $59_R$, respectively. Further, the spool 63 has three annular recesses 78 provided on an outer surface thereof at axially spaced apart distances and adapted to permit communication between one annular groove 76 and the port $77_{FL}$, between another annular groove 76 and the port $77_{FR}$ and between the third annular groove 76 and the port $77_R$, when the spool 63 is in an end position to which it has been moved in one axial direction, and to shut off such communications in response to movement of the spool 63 in the other axial direction. Moreover, the spool 63 is provided with a communication passage 79 which permits communication between the oil chamber 70 and the hydraulic pressure working chamber 71.

The drive solenoid 64 is arranged to expand the urging rod 72 in its energized state, thereby urging the spool 63 in the said other axial direction, and is controlled to be switched over between energized and deenergized states by the control circuit 3. When the drive solenoid 64 is in its deenergized state, the spool 63 assumes, under the action of the spring force of the spring 74, a position in which the collar 73 abuts against the step between the second and third bore portions 66 and 67, i.e. a valve-opening position in which the oil passage 58 and the oil passages $59_{FL}$, $59_{FR}$ and $59_R$ are put into communication with each other. When the drive solenoid 64 is energized, the spool 63 is moved from the valve-opening position in the said other axial direction to a valve-closing position in which the oil passage 58 and the oil passages $59_{FL}$, $59_{FR}$ and $59_R$ are put out of communication with each other.

The locking means 5 in the fourth housing 69 comprises a restraining rod 80 slidably received in the fourth housing for movement into coaxial abutment against the other end of the spool 63, and a spring 81 for biasing the restraining rod 80 in a direction to so abut the spool.

The fourth housing 69 is provided with a smaller diameter bore 82 coaxially connected to the hydraulic pressure working chamber 71, and a larger diameter bore 83 coaxially connected to one end of the smaller diameter bore 82 with a step therebetween. The other end of the larger diameter bore 83 is closed by a lid member 84. A spring chamber 85 is defined between the fourth housing 69 and the lid member 84 and is connected to the reservoir $R_1$ through an oil passage which is not shown.

The restraining rod 80 is slidably received in the smaller diameter bore 82 with one end thereof protruding into the hydraulic pressure working chamber 71, and an annular sealing member 86 is fitted over an outer surface of the restraining rod 80 in sliding contact with an inner surface of the smaller diameter bore 82. A connecting port 87 is provided in the housing 69 to lead to the hydraulic pressure working chamber 71 and is connected to the hydraulic pressure supply source 1. Thus, when the hydraulic pressure supply source is normally operative, a higher hydraulic pressure is supplied to the hydraulic pressure working chamber 71 and is applied to one end of the restraining rod 80. Further, the spring 81 is mounted in a compressed manner between the restraining rod 80 and the lid member 84 in the spring chamber 85 and has a preset load set at a value which is smaller than a hydraulic pressure applied to the restraining rod 80 in the other axial direction by the hydraulic pressure supplied from the hydraulic pressure supply source 1 to the hydraulic pressure working chamber 71, but which is enough to overcome a force applied from the drive solenoid 64 to the spool 63, thereby enabling the spool 63 to be urged in the said one axial direction when no hydraulic pressure is applied to the hydraulic pressure working chamber 71.

The operation of this embodiment will now be described. If the brake pedal P is operated to effect braking, the control circuit 3 energizes the drive solenoid 64 of the shut-off valve 4 in response to detection of the amount by which brake pedal P is operated by the depression force sensor S. As a higher hydraulic pressure is already supplied from the hydraulic pressure supply source 1 to the hydraulic pressure working chamber 71, the restraining rod 80 of the locking means 5 is in a position in which it has been driven to the right as viewed in FIG. 1 against the spring force of the spring 81, so that the movement of the spool 63 in the said other axial direction is not inhibited. Therefore, the shut-off valve 4 assumes its closed position in which the oil passage 58 and the oil passages $59_{FL}$, $59_{FR}$ and $59_R$ are put out of communication with each other. However, as a detection value provided by the depression force sensor S which has detected the depression force on the brake pedal P is supplied to the control circuit 3 in such condition, the linear solenoid 13 is energized with an energizing current quantity corresponding to such detection value. This causes a hydraulic pressure corresponding to the depression force to be delivered from the hydraulic pressure control units $2_{FL}$, $2_{FR}$ and $2_R$ and to be applied to the brake devices $B_{FL}$, $B_{FR}$ and $B_R$ respectively, thereby providing a braking force.

Suppose it happens that a wheel is about to enter a locked state during such a braking. In such case, the shut-off valve 4 remains closed, but the energizing current quantity for the linear solenoid 13 corresponding to the wheel which is about to become locked is controlled to a smaller level (by means which do not form part of this invention), thereby reducing the hydraulic braking pressure in the brake device for the wheel which is about to enter the locked state, and thus preventing the wheel from entering the locked state.

Suppose that the driving or front wheels are subject to excessive slippage during travelling of the vehicle in a non-braking condition. In this case, the drive solenoid 64 is energized and the linear solenoids 13 of the hydraulic pressure control units $2_{FL}$ and $2_{FR}$ corresponding to the front wheels are also energized, again by means which do not form part of this invention. The shut-off valve 4 remains closed, and the hydraulic pressure delivered from each of the hydraulic pressure control units $2_{FL}$ and $2_{FR}$ corresponding to the front wheels is applied to both the front wheel brake devices $B_{FL}$ and $B_{FR}$ by energization of the linear solenoids 13, so that the hydraulic pressure in the hydraulic braking pressure chamber 8 in each of the front wheel brakes is increased notwithstanding the fact that the brake pedal P is not depressed. This causes a braking force to be applied to the front wheels, thereby reducing the driving force to enable the elimination of the excessive slippage.

Suppose that the hydraulic pressure in the hydraulic pressure supply source 1 becomes abnormally reduced during braking. In this case, since the hydraulic pressure applied to the hydraulic pressure working chamber 71 is reduced abnormally, restraining rod 80 in the working means 5 forcedly urges the spool 63 of the shut-off valve 4 in the said one axial direction, i.e. toward the valve-opening direction, under the action of the spring force of the spring 81. Thus, the spool 63 is locked in the valve-opening position despite energization of the drive solenoid 64, so that the output hydraulic pressure from the master cylinder M can be applied to the brake devices $B_{FL}$, $B_{FR}$, $B_{RL}$ and $B_{RR}$ to provide a braking force.

Further, suppose that the linear solenoid 13 is accidentally operated due to a fault in an electric system including the control circuit 3 and the linear solenoid 13 when there is no braking operation, permitting a hydraulic pressure to be delivered from the hydraulic pressure control units $2_{FL}$, $2_{FR}$ and $2_R$. In this case, the drive solenoid 64 is not energized, and the shut-off valve 4 is in its opened state under the action of the spring 74 on the spool 63. Therefore, the oil passages $59_{FL}$, $59_{FR}$ and $59_R$ are in communication with the reservoir $R_2$ via the shut-off valve 4, the oil passage 58, and the master cylinder M, and thus any hydraulic pressure delivered from each of the hydraulic pressure control units $2_{FL}$, $2_{FR}$ and $2_R$ is released into the reservoir $R_2$, ensuring that hydraulic braking pressure cannot be applied to the brake devices $B_{FL}$, $B_{FR}$, $B_{RL}$ and $B_{RR}$.

We claim:

1. A hydraulic braking pressure control system comprising:
   a master cylinder (M) having an output port (39,40) through which a hydraulic pressure for effecting a braking operation is delivered, the master cylinder having a reservoir ($R_2$) associated therewith and leading to the output port when there is no braking;
   a plurality of brake devices ($B_{FL}$ etc) for a plurality of wheels;
   an operation-amount detector (S) for detecting the amount of braking operation;
   a hydraulic pressure supply source (1);
   a plurality of hydraulic pressure control units ($2_{FL}$ etc) each including a hydraulic pressure control valve (12) interposed between each associated brake device ($B_{FL}$ etc) and the hydraulic pressure supply source, said hydraulic pressure control units being capable of operating the associated brake devices independently of each other,
   electric actuators (13) for actuating said hydraulic pressure control valves, respectively;
   a control circuit (3) for controlling the operation of the electric actuators in accordance with a detection value provided by said operation-amount detector;
   a shut-off valve (4) provided in oil passages (58, $59_{FL}$ etc) connecting the hydraulic pressure control units with the output port in the master cylinder for controlling connection and disconnection of said hydraulic pressure control units with and from said output port collectively, means operable by the control circuit for closing said shut-off valve when a braking operation is detected by the operation-amount detector, and
   a locking means (5) for inhibiting the closing of said shut-off valve when the output hydraulic pressure from said hydraulic pressure supply source is equal to or less than a predetermined value.

2. A system as claimed in claim 1, wherein the said locking means (5) includes locking spring means (81) biasing said shut-off valve (4) to inhibit closure thereof, and means for applying the output hydraulic pressure from said hydraulic pressure supply source (1) to said locking spring means so as to nullify the effect of said locking spring means when said pressure exceeds said predetermined value.

3. A system as claimed in claim 2, including a second spring means (74) biasing said shut-off valve (4) independently of said locking spring means (81) to open the shut-off valve when said shut-off valve is not closed by the control circuit (3) and whatever the condition of the said locking means (5).

4. A system as claimed in claim 3, wherein the said shut-off valve (4) is a spool valve, said means for closing said shut-off valve is an electric actuator (64) connected to said control circuit (3) acting on one end of a spool (63) of the spool valve to urge said spool (63) in a shut-off valve closing direction, and both of said locking and shut-off spring means (81, 74) act on the other end of said spool to urge said spool in a shut-off valve opening direction.

5. A system as claimed in claim 1, wherein each of said hydraulic pressure control units includes a chamber (25) which generates a hydraulic pressure to be supplied to the associated brake device ($B_{FL}$ etc) through operation of the associated electric actuator (13) in response to an input of the output hydraulic pressure from the hydraulic pressure supply source (1), said shut-off valve (4) being connected to the chambers (25) of the hydraulic pressure control units ($2_{FL}$, $2_{FR}$ and $2_R$) via said oil passages (58, $59_{FL}$ etc).

6. A system as claimed in claim 5, wherein said shut-off valve (4) conducts change-over between establishment and interruption of communication of the output port (39, 40) of the master cylinder (M) with the chambers (25) of the hydraulic pressure control units ($2_{FL}$ etc) collectively.

7. A system as claimed in claim 5, wherein said means (64) operable by the control circuit for closing said shut-off valve applies a force to the shut-off valve in a valve-closing direction while said locking means (5) applies a force to said shut-off valve in a valve-opening direction which is larger than said force applied by said means (64) operable by the control circuit, said locking means including a chamber (71) into which the output hydraulic pressure from the hydraulic pressure supply source (1) is introduced at all times so as to nullify said force of the locking means and permit the shut-off valve (4) to move to its closed position with the force of said means (64) operable by the control circuit.

8. A system as claimed in claim 7, wherein spring means (74) are provided for urging said shut-off valve toward its opened position.

* * * * *